United States Patent

[15] 3,637,074

Banyas et al.

[45] Jan. 25, 1972

[54] CONTAINER HANDLING APPARATUS

[72] Inventors: John D. Banyas, Toledo; Frederick L. Wallington, Perrysburg, both of Ohio

[73] Assignee: Owens-Illinois, Inc.

[22] Filed: Mar. 31, 1970

[21] Appl. No.: 24,173

[52] U.S. Cl. ............................................................. 209/74
[51] Int. Cl. ......................................................... B07c 5/04
[58] Field of Search .................... 198/38, 33 AB; 209/74, 90, 209/82

[56] References Cited

UNITED STATES PATENTS

| | | | |
|---|---|---|---|
| 3,279,599 | 10/1966 | Drennan | 209/90 X |
| 3,400,815 | 9/1968 | Bell et al. | 209/80 X |
| 3,432,033 | 3/1969 | Everett | 209/74 X |

*Primary Examiner*—Richard A. Schacher
*Assistant Examiner*—Gene A. Church
*Attorney*—J. R. Nelson and E.J. Holler

[57] ABSTRACT

Apparatus for handling and transferring bulb-shaped glass containers from one station in a container production line to another. A series of container handling vacuum chucks are linked together into an endless chain to pick glass containers in succession up from a first conveyor, to carry the containers through an inspection station, a coating tunnel and past a reject station and to then deposit the containers on a second conveyor. A control valve mounted on each chuck normally supplies the chuck with vacuum, however the control valve is actuated at the container discharge station, and may also be actuated at the reject station to supply air under pressure to the chuck to eject the container.

7 Claims, 16 Drawing Figures

INVENTORS
JOHN D. BANYAS,
FREDERICK L. WALLINGTON.

INVENTORS
JOHN D. BANYAS.
FREDERICK L. WALLINGTON.
BY
J. R. Nelson and
E. J. Haller
ATT'YS.

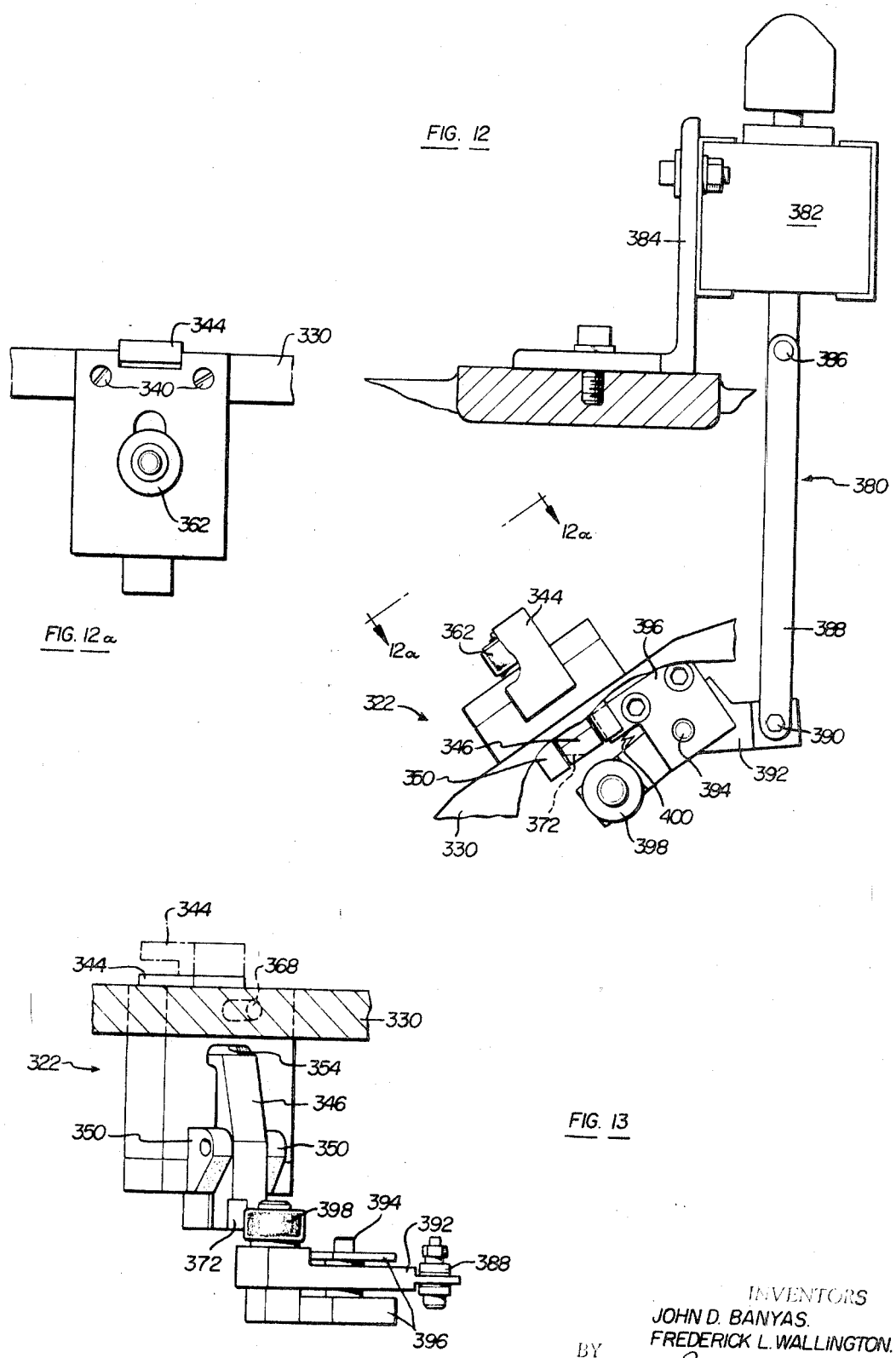

INVENTORS
JOHN D. BANYAS.
FREDERICK L. WALLINGTON.
BY
J. R. Nelson and
E. J. Haller
ATT'YS.

CONTAINER HANDLING APPARATUS

SUMMARY OF THE INVENTION

The container handling apparatus of the present invention is employed in a production line for producing composite containers of the type shown in U.S. Pat. No. 3,372,826. These containers consist of a bulb-shaped glass container having a hemispherical bottom and a cup-shaped plastic base element fitted onto and bonded to the bottom to provide stability to the assembled container. The apparatus of the present invention is employed to receive the bulb-shaped glass containers in an inverted position from a heat treat conveyor, to carry the container through a spray tunnel where the container is provided with a coating to enhance the scratch resistance and lubricity of the glass container and to subsequently deposit the container in an assembly machine where the plastic base is assembled on the container. In addition to coating the container, an inspection device inspects the sidewall and finish of the container before the spray tunnel and is linked to a rejection mechanism which, in response to signals from the inspection station, is operable to reject malformed containers before they are deposited on the assembly machine.

To grip and carry the containers, the apparatus includes a plurality of vacuum chucks linked together into an endless chain for movement along an endless path during which the chucks are successively moved into operative alignment with containers on the infeed conveyor, are manipulated to pick the containers up from the infeed conveyor, carry them through the inspecting, coating and reject stations and to then move into operative alignment with the assembly machine and deposit the containers onto the assembly machine. In view of the relatively high-line speed (as many as 600 containers per minute) the vacuum chuck is provided with a control valve which is actuable to supply air under pressure to the chuck to provide a rapid ejection of the container from the chuck either at the reject station or at the discharge station.

Other objects and features of the invention will become apparent by reference to the following specification and to the drawings.

In the drawings:

FIG. 12 is a top plan view of the reject latch trip actuator;

FIG. 12a is a detail side view of the trip actuator taken from line 12a—12a of FIG. 12;

FIG. 13 is an end elevational view of the reject latch trip actuator, with certain parts broken away or omitted;

GENERAL DESCRIPTION OF SYSTEM

Figure 1:
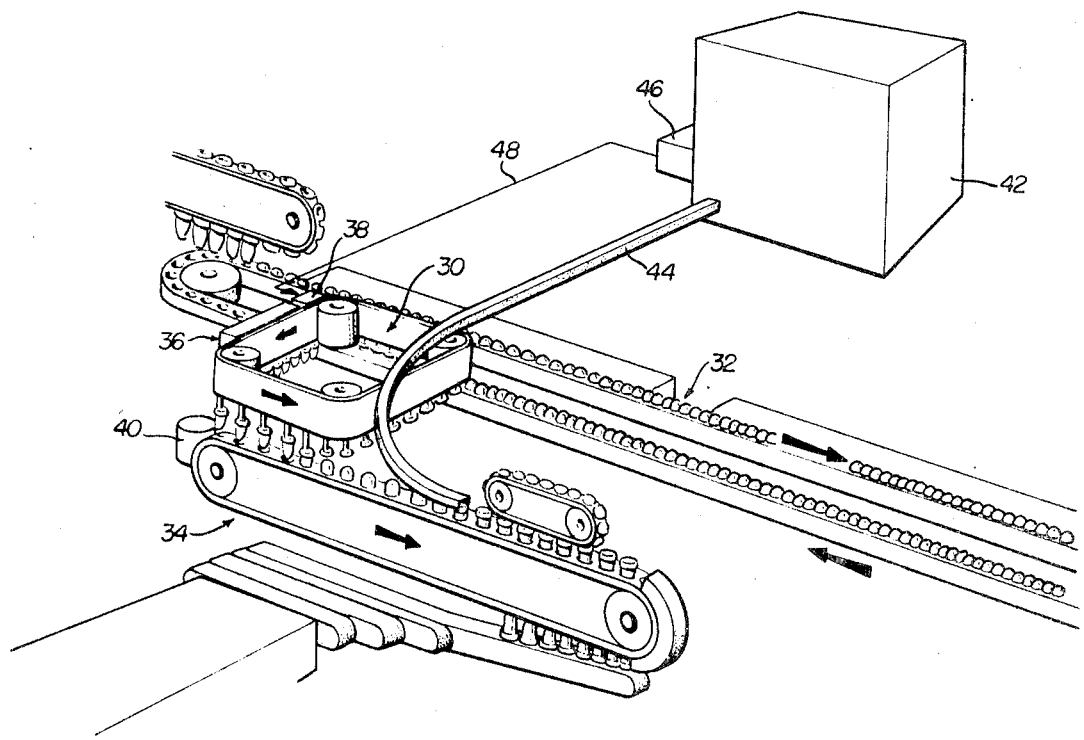
FIG. 1 is an overall perspective view of an installation embodying the present invention.

Referring first to FIG. 1, there is shown a portion of a production line for making and assembling composite containers of the type shown in U.S. Pat. No. 3,372,826. These composite containers consist of a bulb-shaped glass container having a hemispherical bottom and a cup-shaped plastic base element which is fitted onto and bonded to the glass container bottom to provide a stable support for the container.

The function of the machine 30, to which the present application is directed, is to transfer the glass containers from a heat treat conveyor designated generally 32 in FIG. 1 to an assembly machine 34, upon which the plastic base elements are assembled onto the glass container. Assembly machine 34 is the subject of a copending application of James D. Mallory et al., Ser. No. 883,515, filed Dec. 9, 1969 and assigned to the assignee of the present application.

During the transfer of the containers from conveyor 32 to assembly machine 34, the containers are sprayed with a coating to improve the scratch resistance and lubricity of the container. This coating is applied as the container is conveyed by machine 30 through a spray tunnel designated generally 36. Before its passage through tunnel 36 the container is subjected to a sidewall and finish inspection and substandard containers are automatically rejected at a reject station designated generally 38 and drop into a cullet chute 40.

The reject station may be operated to reject all containers passing through machine 30. One of many examples of situations where it might be wanted to reject all containers would be in the event that the supply of plastic bases which are to be assembled on the containers at assembly machine 34 is depleted. The plastic bases are supplied from a schematically illustrated base supply source 42 via a chute 44 to assembly machine 34. A suitable detector 46 on base supply source 42 is operatively connected by a control coupling schematically illustrated at 48 to reject station 38 and operates the reject station, in a manner to be described below, to continually reject containers in the event of an inadequate supply of bases.

HEAD ASSEMBLY

Figure 4:
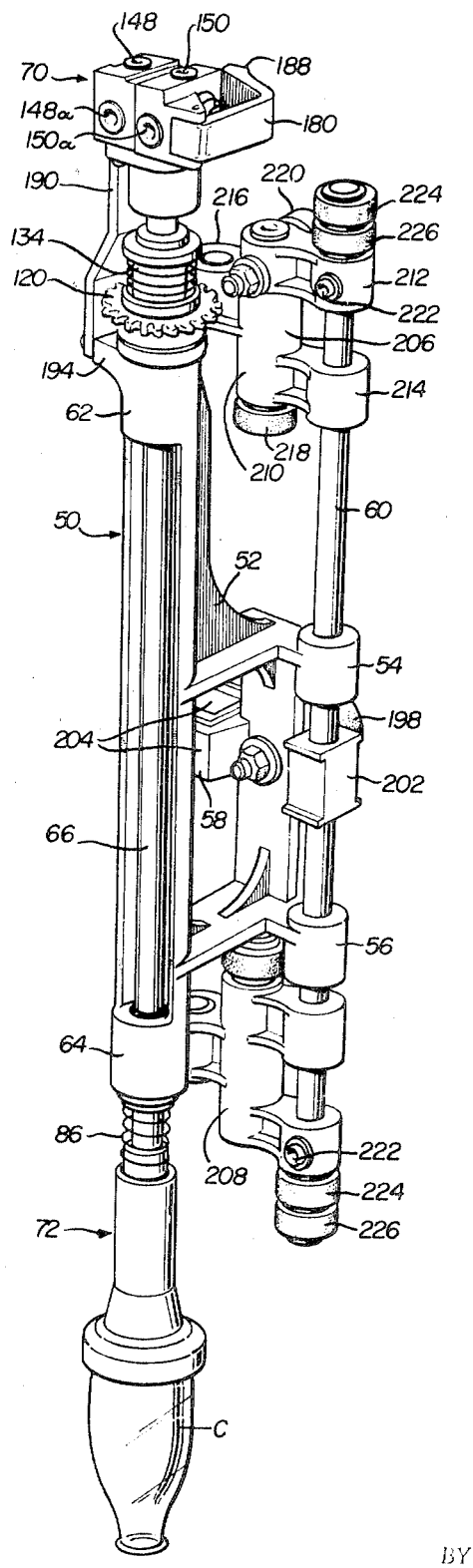
FIG. 4 is a perspective view of a container handling head employed in the apparatus.
Figure 5:
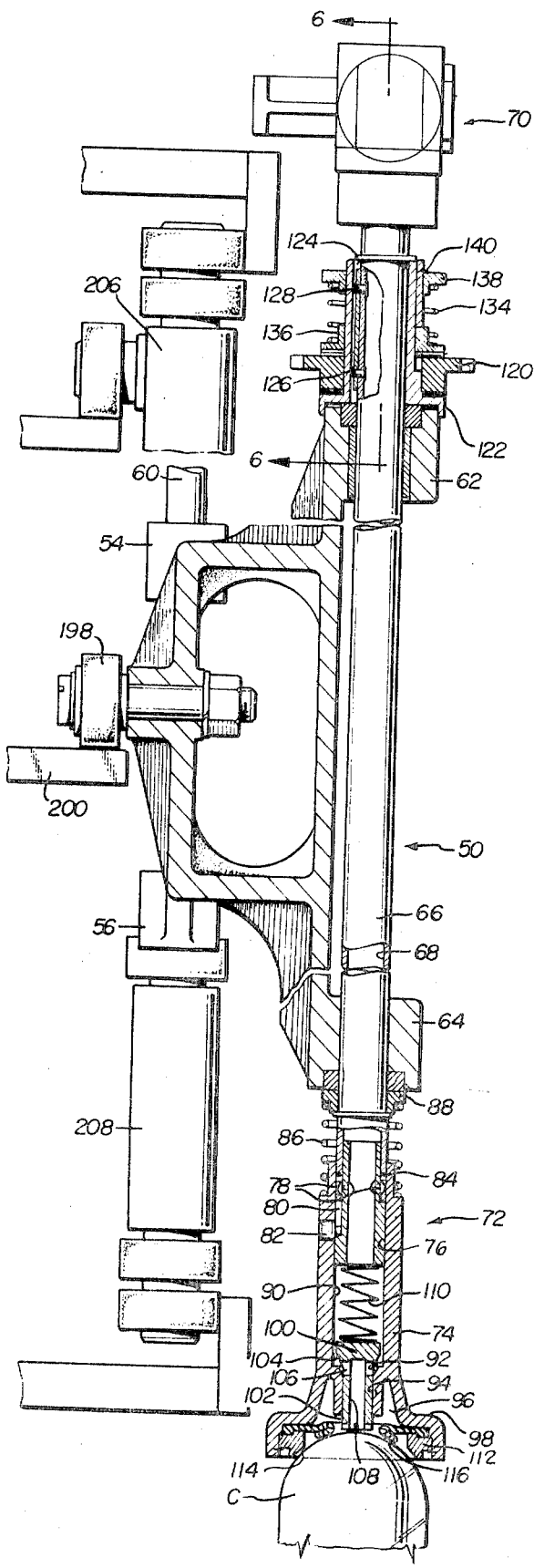
FIG. 5 is a detail cross-sectional view taken on a central vertical plane through the container handling head.
Figure 6:
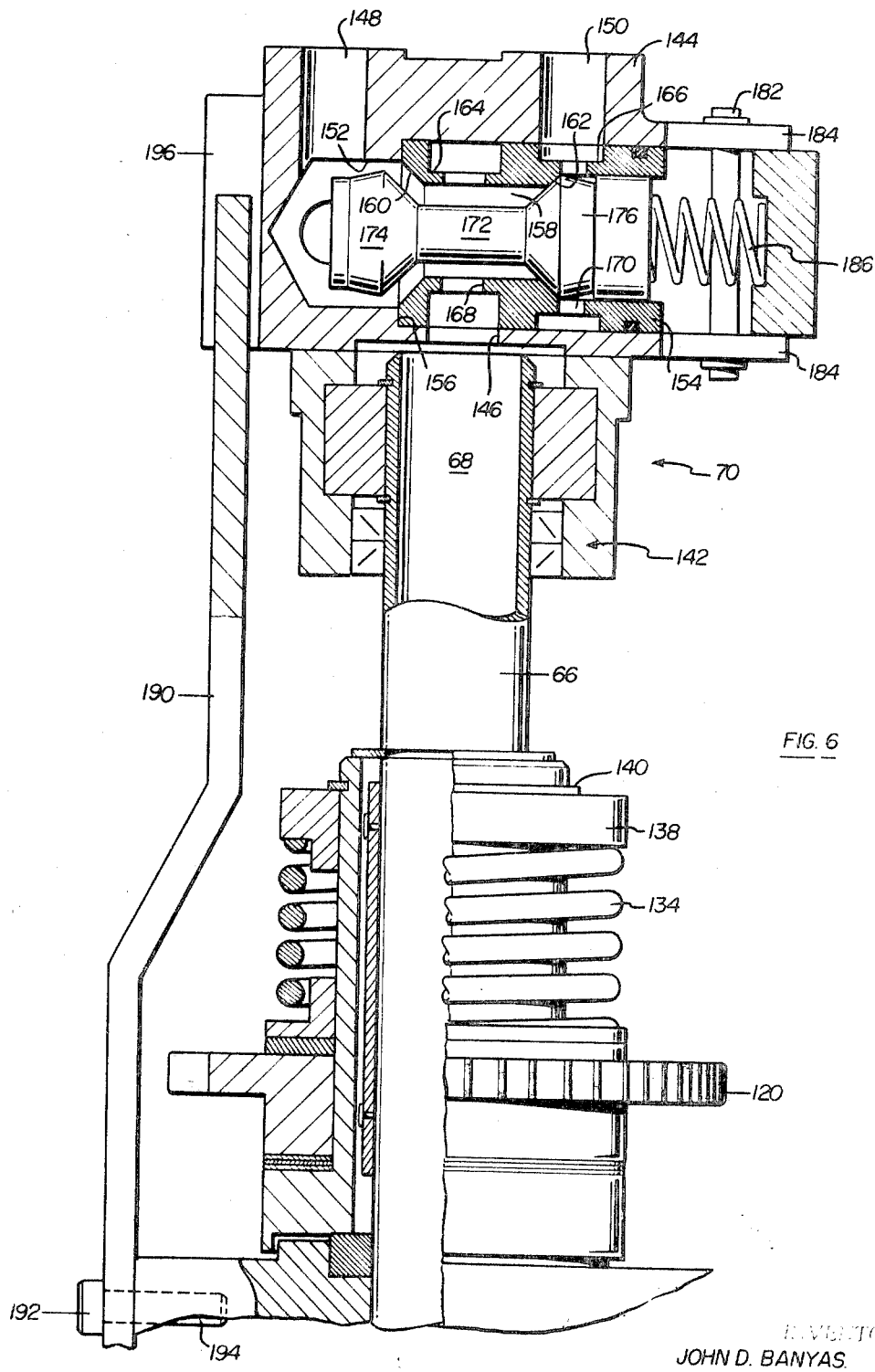
FIG. 6 is a detail cross-sectional view, taken approximately on line 6—6 of FIG. 5, showing details of the chuck control valve.

To transport the containers between conveyor 32 and assembly machine 34, machine 30 employs a plurality of individual head assemblies designated generally 50 which are linked together into an endless chain for movement along a generally rectangular endless path. Details of an individual head assembly 50 are shown in FIGS. 4–6.

Each head assembly 50 includes a support bracket 52 having a pair of vertically spaced front coupling bushings 54, 56 and a rear coupling bushing 58. In linking the head assemblies into an endless chain, vertical rods 60 are passed through the upper and lower coupling bushing 58 of the next adjacent head assembly.

Each bracket 52 also is constructed with vertically spaced upper 62 and lower 64 chuck support bushings which rotatively receive a hollow tubular chuck shaft 66. The hollow interior of shaft 66 defines a conduit 68 which provides fluid communication between a control valve designated generally 70 mounted on the upper end of shaft 66 and a chuck designated generally 72 mounted on the lower end of shaft 66.

Chuck 72 includes an annular housing 74 which is mounted for axial sliding movement on the lower end of shaft 66 by a structure which includes an adapter 76 fixedly secured, as by rivets 78, to the lower end of shaft 66 and having an axial extending groove 80 which slidably receives a pin 82 mounted in housing 74 to guide and define end limits of axial movement of housing 74 on lower end of shaft 66. A sliding seal at 84 is provided between shaft 66 and housing 74. Housing 74 is normally maintained at its lower end limit of travel relative to shaft 66 both by gravity and by a biasing spring 86 seated between the upper end of housing 74 and a retainer 88 seated at the lower end of lower coupling bushing 64.

Housing 74 is formed with a central passage 90 having an inwardly tapering valve seat 92 near its lower end. A reduced diameter passage 94 extends axially downwardly from valve seat 92 and opens at its lower end into a recess 96 formed in the interior of an enlarged diameter end portion 98 of housing 74. A valve member having a head 100 also includes a stem 102 which is slidably received within reduced diameter passage 94. Head 100 is formed with a conical surface 104 adapted to seat against valve seat 92. Transverse passages 106 communicate with an axial passage 108 through the stem to place passage 90 in communication with recess 96 when the valve is unseated as shown in FIG. 5. Head 100 is normally biased against seat 92 by a compression spring 110 seated between the valve head and the lower end of adapter 76.

At the mouth of recess 96, an annular container seat 112 is mounted within housing 74. The container engaging surface of seat 112 surrounds an opening 114 which is of a diameter smaller than the diameter of the bottom of a container C. Inwardly of recess 96 from container seat 112 is mounted an annular seal 116 which, as indicated in FIG. 5, provides a peripheral seal closing chamber 96 from the atmosphere when a container bottom is engaged with seat 112. With the container thus seated, the container bottom engages the lower end of valve stem 102 to elevate the valve head off valve seat 92, thereby placing passage 90 and the interior of shaft 66 in communication with recess 96. When no container is engaged with seat 112, surface 104 of valve head 100 sealingly engages valve seat 92 to block communication between passage 90 and recess 96.

Shaft 66 and chuck 72 may be driven in rotation in bushings 62 and 64 by means of a sprocket 120 mounted on shaft 66 above upper coupling bushing 62. A flanged sleeve 122 is mounted upon shaft 66 and formed with an axial extending key slot 124 which receives a key in the form of a strip of metal 126 riveted to shaft 66 as by rivets 128. Sprocket 120 is made of a molded polyurethane material which acts as a friction surface and is frictionally biased against flanged sleeve 122 by a spring 134 engaged between two flanged hubs 136 and 138. Hub 138 is held against axial movement on sleeve 122 by a keeper ring 140.

Valve 70 is mounted upon the top of shaft 66 for rotation relative to the shaft by a coupling sleeve assembly designated generally 142 which forms a rotary seal with the top of shaft 66. Housing 144 of valve 70 is constructed with an outlet port 146 in direct communication with the internal conduit 68 of shaft 66. At the top of housing 144 a pressure supply port 148 and a vacuum supply port 150 are bored into the housing to communicate with a central passage 152 bored in housing 144. A cartridge sleeve 154 is received within bore 152 and is axially seated at its inner end against a shoulder 156 in passage 152. Cartridge 154 is formed with a central axially extending passage 158 which goes all the way through sleeve 154 and is internally formed with two oppositely facing valve seats 160 and 162. Two annular grooves 164 and 166 extend around the periphery of sleeve 154 and communicate with the central passage 158 via ports 168 and 170 respectively. Auxiliary pressure and vacuum ports 148a and 150a are bored in housing 144 and are in constant communication with the corresponding ports 148 and 150 via the inner end of passage 158 (ports 148 and 148a) and recess 166 (ports 150 and 150a).

A valve member 172 is provided with a pair of oppositely facing valve heads 174 and 176 which are respectively engageable with valve seats 160 and 162.

In FIG. 6, valve 70 is shown in its abnormal or actuated position in which valve head 174 is spaced clear of seat 160 to place port 148 in communication with ports 168 and 146.

Valve 70 is normally maintained in the opposite condition to that shown in FIG. 6 with valve head 174 seated against valve seat 160 and valve head 176 spaced to the right from valve seat 162. In this position, vacuum supplied to port 150 passes through the valve to ports 168 and 146. Air under pressure supplied at pressure supply port 148 acts against the left-hand side of valve head 174 to maintain the valve in the normal position, this action being augmented by the reduced pressure at the right-hand side of valve head 174.

Figure 10:
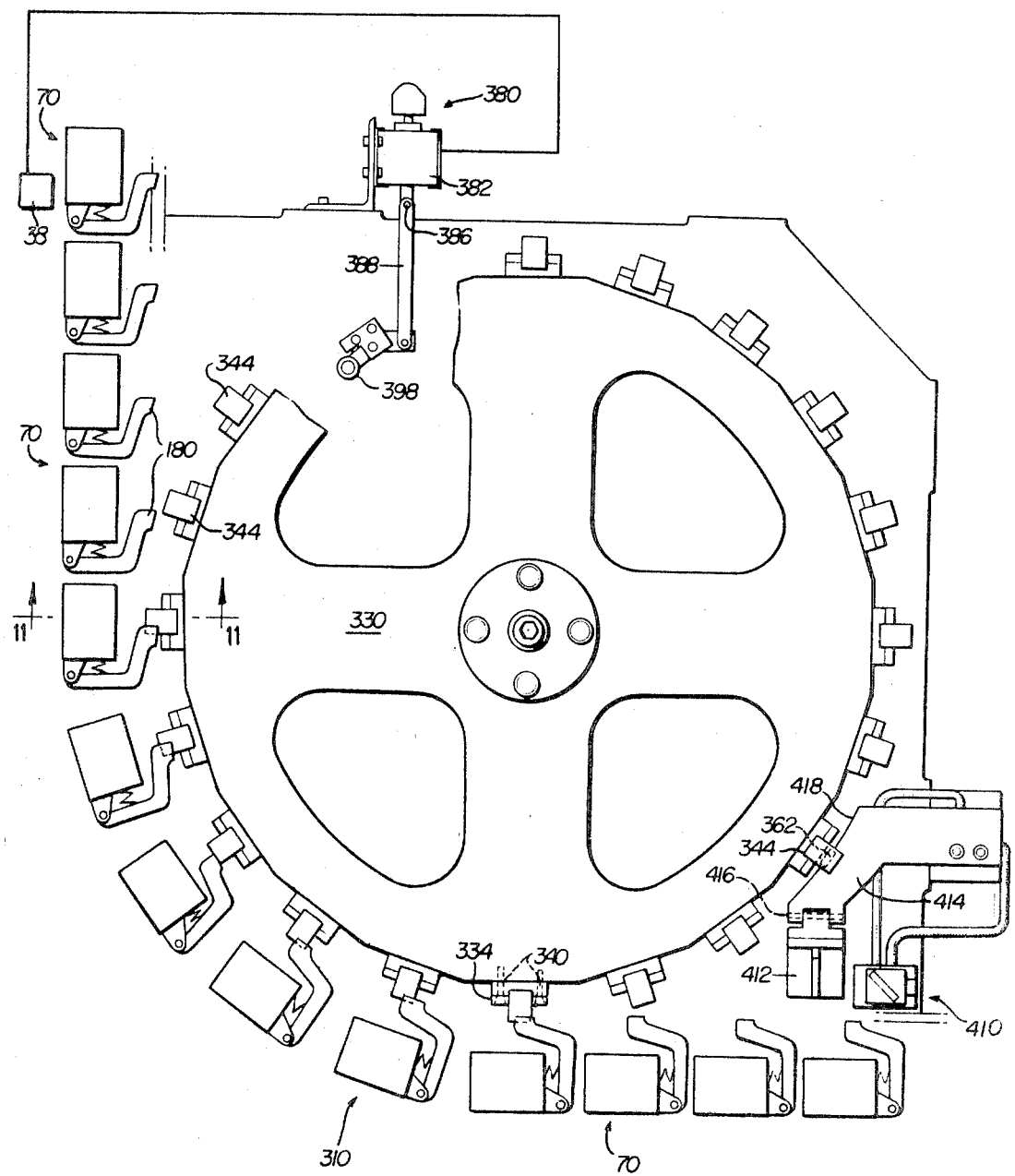
FIG. 10 is a top plan view of the reject mechanism, with certain parts broken away or omitted.

Valve 70 is shifted to the abnormal or actuated position shown in FIG. 6 by a valve actuating arm 180 pivotally mounted upon a pin 182 passing through a pair of lugs 184 integrally formed on valve housing 144 (See FIG. 10). A compression spring 186 is engaged between the inner side of actuating arm 180 and the right-hand end of valve member 172. As best seen in FIG. 10, actuating arm 180 is of a generally U-shaped configuration when viewed from the top, one leg of the U being mounted on pin 182 and the opposite leg of the U being projected clear of the valve body at its opposite side and terminating in an enlarged actuator engaging bump 188.

Under normal conditions, air under pressure acting against the left-hand side of valve head 174 is sufficient to hold head 174 against its seat 160 and, through the action of spring 186, position arm 180 at its extreme limit of clockwise movement about pivot pin 182 as viewed in FIG. 10. During movement of the head assembly along its path, actuator arm 180 is at the front or leading side of the assembly with respect to its direction of movement with the bump 188 on the arm projecting out to one side of the path. Upon engagement of bump 188 with either a stationary cam on the machine frame or by actuating element of a reject system to be described below, the engagement pivots arm 180 in a counterclockwise direction about pivot pin 182 through spring 186 to shift valve member 172 to the position shown in FIG. 6. Spring 186 is quite stiff and does not normally compress during valve shifting. However, the spring can give when the valve is seated to permit overtravel.

Valve 70 is held against rotation with shaft 66 by an upwardly projecting finger 190 bolted at its lower end as by bolts 192 to a projection 194 on upper coupling bushing 62. The upper end of finger 190 is slidably received within a complementary slot 196 formed on housing 144. The sidewalls of slot 196 engage the upper end of finger 190 to hold valve body 144 against rotation with shaft 66.

Vertical rods 60 which link head assemblies 50 into an endless chain are supported and guided for movement relative to the machine frame along a fixed path by structure to be described below. In picking up containers from conveyor 32 and depositing the containers on assembly machine 34, it is necessary for the head assemblies to move up and down in a vertical direction relative to the fixed path of rods 60. Bushings 54, 56 and 58 enable head assembly 50 to slide up and down on rods 60. Vertical positioning of head assemblies 50 along rods 60 is accomplished by a support roller 198 rotatably mounted on bracket 52 for rotation about a horizontal axis, roller 198 being supported upon a track 200 fixedly mounted on the machine frame and provided with appropriate inclined and flat sections to be discussed below.

As explained above, when the head assemblies 50 are assembled into an endless chain, a series of vertical rods 60 are employed, each rod passing through the front coupling bushings 54 and 56 of one head assembly and also through the rear coupling bushing 58 of the next head assembly 50. Coupling bushing 58 is one of the floating type in which a bushing element 202 is slidably received between a pair of arms 204 formed on support bracket 52 so that bushing 202 can shift horizontally forward and backwards to accommodate a slight relative displacement between the adjacent head assemblies.

Vertical rods 60 of the endless chain are coupled to each other by upper and lower link assemblies 206 and 208 respectively. With two minor exceptions to be discussed below, upper and lower links 206 and 208 are identical, and thus only link 206 will be described in detail, it being understood that the description is equally applicable to lower link 208.

Link 206 if formed with a vertically extending central body portion 210 having integrally formed upper 212 and lower 214 front coupling bushings projected forwardly from body 210. Bushings 212 and 214 are vertically spaced from each other, and a rear coupling bushing 216 is formed centrally on the rear of body 210. A roller 218 is rotatably mounted in link body 210 for rotation about a vertical axis, while a support roller 220 is mounted in body 210 for rotation about a horizontal axis near the upper end of body 210.

Link 208 is identical in structure to link 216, except that link 208 does not have a support roller 220 and link 208 is mounted upon rods 60 in an upsidedown relationship relative to upper link 206.

Links 206 and 208 couple rods 60 to each other into an endless chain, each rod 60 passing through the front coupling bushings of one link and the rear coupling bushing of an adjacent link, the rear coupling bushing of one link projecting between the front coupling bushings of the next link.

The front coupling bushings of each link 206 and 208 are fixedly secured to the vertical rod 60 as by bolts 222 which pass radially through one of the front bushings into tapped bores in rod 60. The rear coupling bushings are freely rotatable on rods 60. Pairs of guide rollers 224 and 226 are rotatably mounted at the upper and lower ends respectively of each rod 60.

Figure 2:
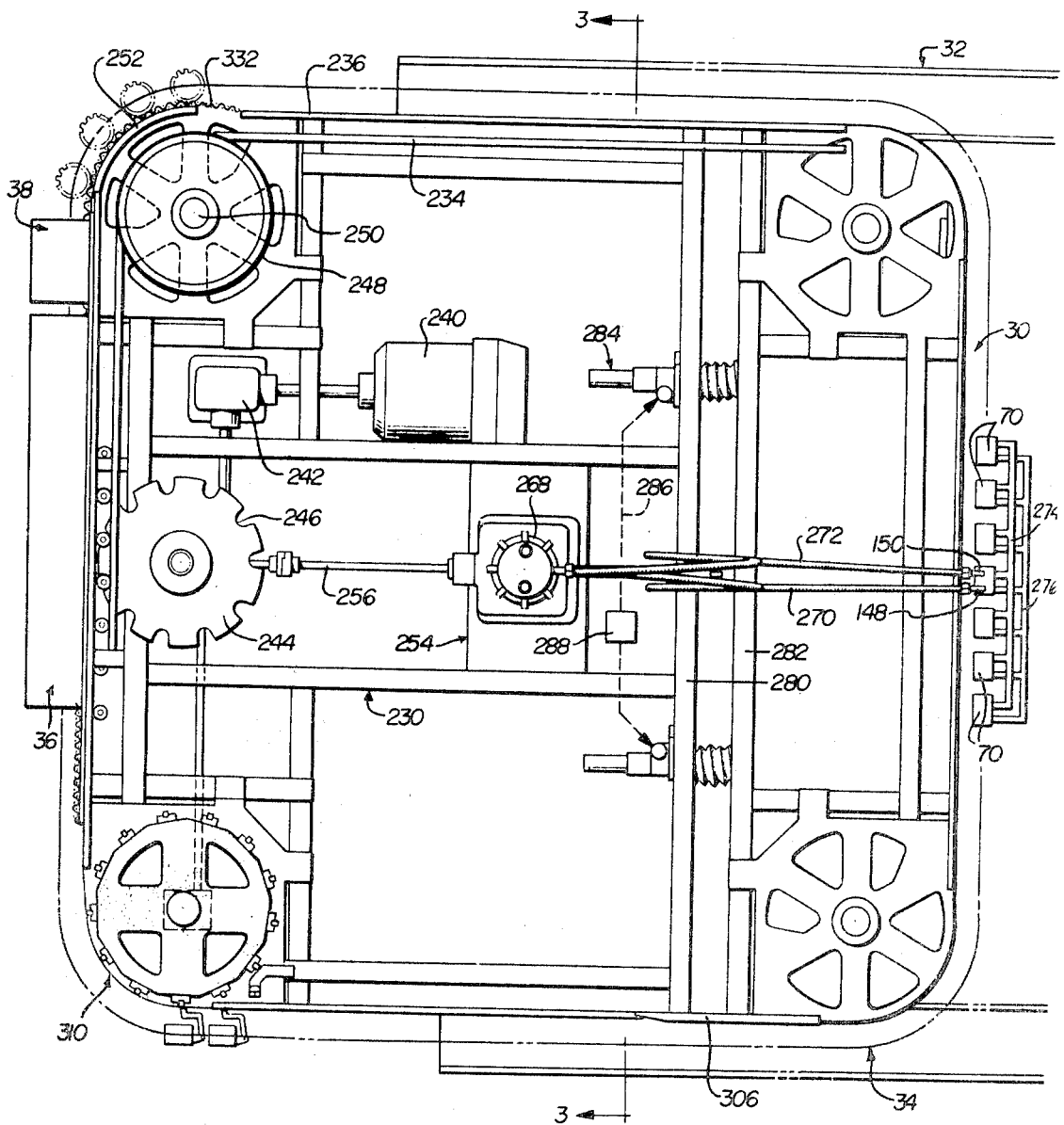
FIG. 2 is a top plan view of the container handling apparatus of the present invention with certain parts broken away or omitted for the sake of clarity.
Figure 3:
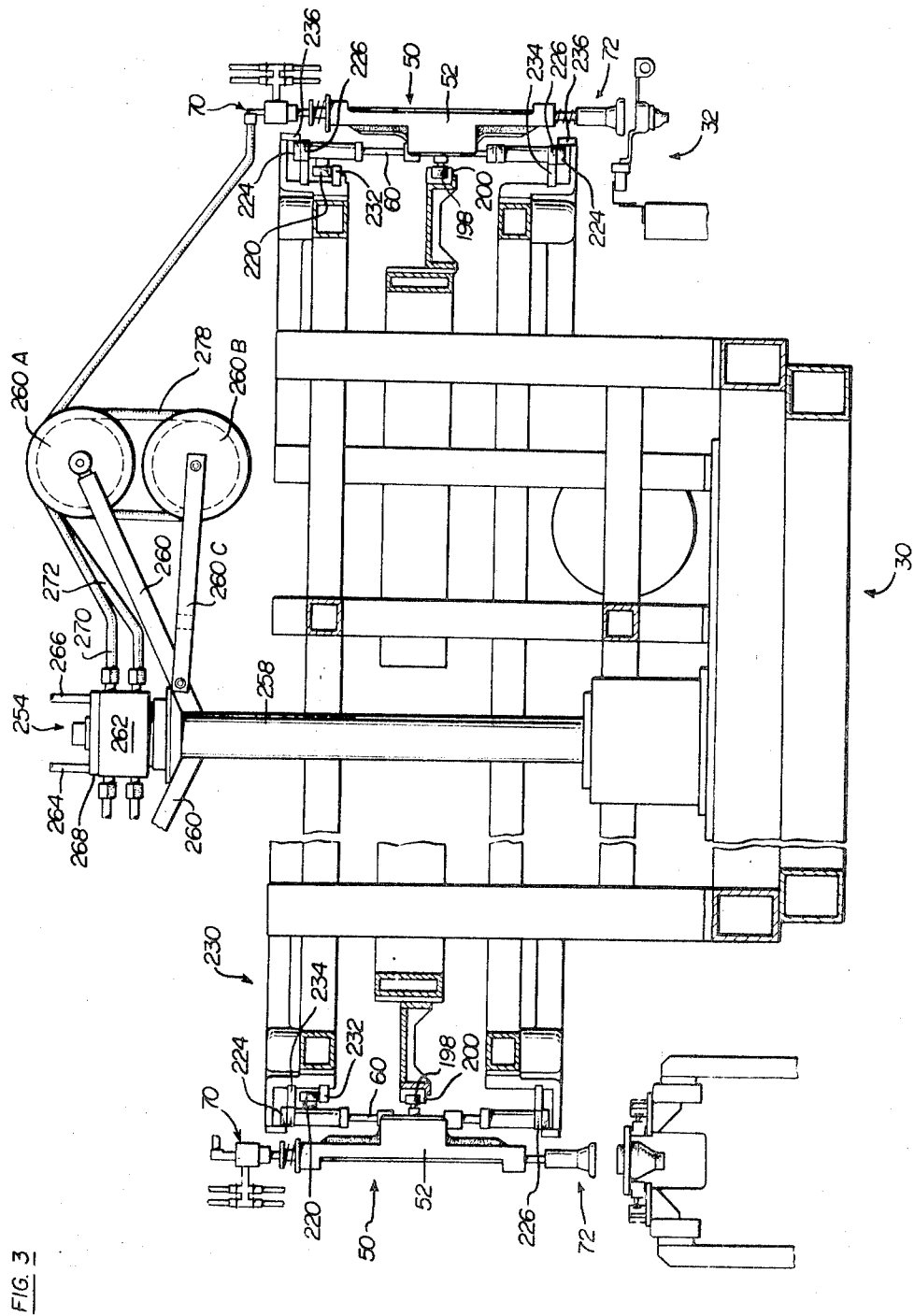
FIG. 3 is a cross-sectional view of the apparatus taken approximately on line 3—3 of FIG. 2, again with various parts broken away or omitted.

Referring now to FIG. 3, the support rollers 220 and guide rollers 224 and 226 rotatably engage various tracks fixedly mounted upon the frame 230 of machine 30. Support rollers 220 of upper links 206 support rods 60 from a track 232 fixedly mounted upon the machine frame and extending along the entire periphery of the path of movement of the endless chain formed by the linked rods 60. Track 232 is horizontal throughout its entire extent and forms a horizontal reference plane from which vertical positioning of the individual head assemblies 50 can be measured. The paired sets of guide rollers 224 and 226 at the respective upper and lower ends of rods 60 engage inner and outer guide tracks 234 and 236 respectively. The configuration and structure of the inner and outer guide tracks 234 and 236 which engage and guide upper guide rollers 224 is identical to the corresponding set of lower tracks 234 and 236. Inner and outer tracks 234 and 236 define the configuration of the endless path of movement of the linked chain of rods 60, this path when viewed from above (see FIG. 2) being of generally rectangular shape having rounded corners. Tracks 232, 234 and 236 thus define a fixed and unvarying path of movement of rods 60 while rods 60 in turn support head assemblies 50 for vertical movement on the rods, under the control of roller 198 and its cam track 200.

MACHINE DRIVE AND PRESSURE DRIVE

Referring first to FIG. 2, the endless chain of linked head assemblies 50 is driven in movement along the path defined by the roller and track system described above in a counterclockwise direction as viewed in FIG. 2. A main drive motor 240 is coupled through a suitable gear reduction and drive train designated generally 242 to drive a main drive wheel 244 in rotation about a vertical axis at a location midway along one side of the endless path of movement of head assemblies 50. Drive wheel 244 is essentially a wheel formed with recesses 246 shaped to mesh with and drivingly engage the rollers 218 and 226 of links 206 and 208.

At each corner of the endless path, inner guide rails 234 move into tangential relationship with an idler wheel 248 mounted in the machine frame for free rotation about a vertical axis established by a guide wheel shaft 250. Outer guide tracks 236 are continued around the corners of the path by curved sections 252 fixedly mounted upon the machine frame. Two idler wheels 248 are mounted on each shaft 250, an upper and a lower wheel for engagement with the upper and lower guide rollers 226.

Vacuum and air pressure are supplied to each of the valves 70 on head assemblies 50 from a centrally located rotating carousel 254 which is driven in rotation about a vertical axis centrally located with respect to the path of movement of assemblies 50 by a coupling shaft 256 which is driven in turn from the main drive train 242. As best seen in FIG. 3, carousel 254 includes a rotating central vertical shaft 258 having a plurality of radially projecting arms 260 fixedly mounted upon shaft 258 near its upper end. At its upper end, shaft 258 carries an air-vacuum distributor 262 which rotates with the shaft. Air under pressure is let into distributor 262 from a pressure line 264, while vacuum is supplied to the distributor by a second conduit 266. Conduits 264 and 266 are connected into a stationary plate 268 mounted at the top of distributor 262 and the two conduits remain stationary while distributor 262 rotates beneath it, a rotary seal being maintained between the tip plate 268 and the main body of rotating distributor 262. Flexible air pressure lines 270 and vacuum lines 272 are coupled to the rotating distributor and formed into a loop 278 which is supported at the outer end of each arm 260.

Referring now to FIG. 2, conduits 270 and 272 are grouped in pairs at distributor 268 and are led, via loops 278 into the main pressure and vacuum ports 148 and 150 of a valve 70. To minimize the number of conduits 270 and 272, the auxiliary ports of a group of valves 70 are commonly connected to each other by manifolds 274 and 276, manifold 274 being connected to the auxiliary ports 150a of the group of valves, while manifold 276 commonly connects all of the auxiliary pressure ports 148a of this group of valves. The main ports 148 and 150 of those valves 70 of a group which are not connected directly to conduits 270 and 272 are plugged. Only one such group of valves has been shown in FIG. 2 for the sake of clarity.

Because of the generally rectangular shape of the path followed by the valves, the conduits 270 and 272 must extend and contract, since the radial distance from distributor 268 to a corner of the endless path is greater than the distance between distributor 268 and a location midway along one side of the path. Loops 278 accommodate this variation in distance and also relative movement between the opposite ends of the conduits due to the fact that distributor 262 rotates at a constant speed in a circular path, while valves 70 move at a constant speed along a noncircular path. The conduit loops 278 are reeved about upper and lower pulleys 260A and 260B respectively. Pulley 260A is rotatably supported at the outer forked end of a rigid arm 260, and pulley 260B is rotatably supported at the outer forked end of a member 260C pivotally mounted on arm 260 so that lower pulley 260B floats and provides a counterweight keeping loop 278 taut at all times.

In order to accurately regulate the tension in the endless chain of head assemblies 50, machine frame 230 is constructed in two sections 280 and 282. Frame section 280 is stationary and fixedly mounted in position upon a subbase, while frame section 282 is mounted upon frame section 280 for movement to frame section 280 from left to right as viewed in FIG. 2. Movable frame section 282 may be shifted upon stationary frame section 280 by two or more worm-driven screw assemblies designated generally 284 so frame 230 can be elevated or lowered for different bottle heights. The driving elements of the screw assemblies 284 are mechanically linked as by a coupling schematically indicated at 286 to a common drive element schematically shown at 288. The purpose of common drive element 288 and the mechanical coupling 286 is to assure that frame section 282 remains in accurate parallelism with frame section 280 during adjustment.

As explained above, the vertical rods 60 which link the head assemblies 50 to each other in an endless chain are supported and guided in movement along a path determined by the engagement between support roller 220, which rides on track 232 to establish the elevation of rod 60 and the upper and lower pairs of guide rollers 224 and 226 which engage upper and lower pairs of guide rails 234 and 236 to establish the location of the path of rods 60 horizontally. Support roller track 232 lies in a horizontal general plane, and thus vertical rods 60 stay at a constant elevation throughout their movement around the endless path. Head assemblies 50, however, are slidably supported upon rods 60 and are moved vertically up and down along the rods at certain locations along the endless path. The vertical position of head assemblies 50 is established by the engagement between support roller 198 mounted upon the head assembly and its track 200. Track 200 generally is located at a fixed elevation except during those portions of its path which extend along conveyor 32 and assembly machine 34, at which locations track 200 dips downwardly to lower chucks 72 into operative relationship with conveyor 32 or assembly machine 34 during the pickup of containers from conveyor 32 and the discharging of containers onto assembly machine 34. The configuration of track 200 at these two locations is shown schematically in FIGS. 7 and 8.

Figure 7:
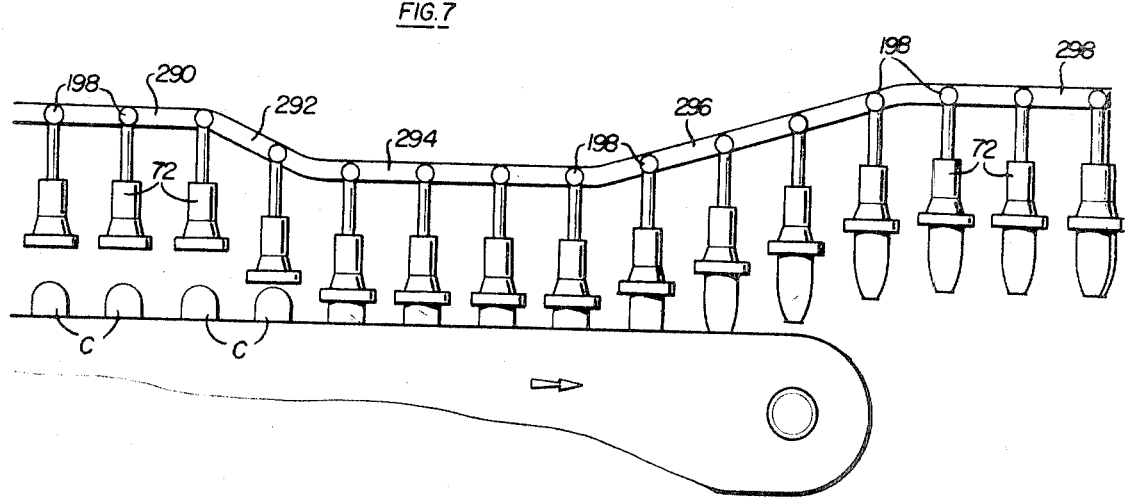
FIG. 7 is a schematic view illustrating the manner in which containers are picked up or loaded onto the apparatus.

Referring first to FIG. 7, as the heads 50 move around a corner of the endless path onto the run overlying conveyor 32, track 200 is at its normal elevation as at 290, and as heads 50 move onto this run, their chucks 72 are supported, by the engagement of their guide wheel 198 in track 200, at an elevation well clear of containers C moving along conveyor 32 from left to right as viewed in FIG. 7. Movement of chucks 72 is synchronized with the movement of containers C along conveyor 32 so that as each chuck moves along section 290 of track 200, the chuck is in vertical alignment with a container C on conveyor 32 and is maintained in this vertical alignment. Track section 290 merges into a downwardly inclined section 292 and, as the support rollers 198 of the respective heads 50 move along downwardly inclined section 292, chucks 72 move downwardly toward the respective containers. At the lower end of downwardly inclined section 292, track 200 is formed with a horizontal section 294 located at an elevation relative to conveyor 32 such that chucks 72 are sealed to, but not quite fully seated upon containers on conveyor 32 in the position shown in FIG. 5.

It will be recalled from the preceding description of the chucks that the control valves 70 are normally maintained in their normal condition at all locations shown in FIG. 7. However, valve head 100 closes the lower end of the vacuum supply passage within the chuck 72 until, as the chuck is carried onto and along horizontal track section 294, the container engages the lower end of stem 102 on valve head 100 (FIG. 5) to lift the valve and admit vacuum into the chuck. Thus, as the chuck 72 moves along track section 294, vacuum is applied to the chuck to cause the chuck to operatively grip the container. The application of vacuum to the interior of the chuck sucks the container bottom up onto the seat. At the right-hand end of track section 294, it merges with an upwardly inclined track section 296 which elevates the chucks 72, thus lifting the gripped containers upwardly clear of conveyor 32. As the chucks approach the corner of their endless path at which they leave conveyor 32, track 200 is at its maximum elevation at section 298, with the suspended containers well clear above conveyor 32.

Figure 8:
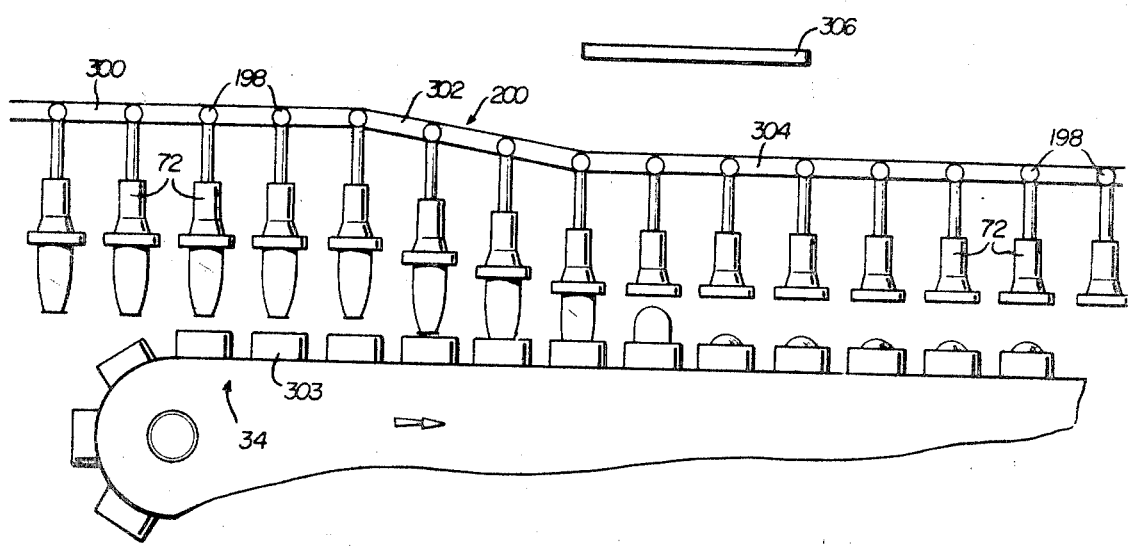
FIG. 8 is a schematic view showing the manner in which the containers are normally transferred from the apparatus of the present invention to the assembly machine.

Track 200 is maintained at its maximum elevation as the chucks move along that side of their path extending between conveyor 32 and assembly machine 34. Referring now to FIG. 8, as the chucks move around the next corner of the path into overlying relationship with assembly machine 34, their guide rollers 198 move along a level section 300 of track 200 which supports chucks 72 at a position such that their suspended container is well clear of assembly machine 34. Again, assembly machine 34 is synchronized with the movement of chucks 72 such that the suspended containers are moved into vertical alignment with container receiving pockets 303 carried on conveyor 34 and moving from left to right as viewed in FIG. 8. As the guide rollers of the respective chucks move from left to right as viewed in FIG. 8, they pass along a downwardly inclined track section 302 which causes the chucks 72 to be lowered downwardly to partially insert the suspended container into the aligned pocket 303 on assembly machine 34. Downwardly inclined section 302 merges with a horizontal discharge section 304 of track 200 along which the containers are discharged from the chucks into the respective pockets.

The discharging of the containers is accomplished by a stationary valve actuating cam 306, located above and generally coextensive with discharge section 304 at a position such that cam 306 engages and depresses the valve actuating arms 180 of the control valves 70 associated with the respective chucks. The engagement between cam 306 and valve actuating arms 180 shifts the connections within valve 70 to disconnect chuck 72 from the vacuum source and simultaneously connect the air pressure source to the chucks to eject the containers from the chuck 72 into the pocket 303 on assembly machine 34.

The elevation of discharge section 304 relative to the path of movement of pockets 303 is such that chucks 72 have vertical clearance above the containers after they have been ejected and seated in pockets 303. After passing discharge section 304 of the track 200, the chucks are at their normal elevation which is the same elevation as 290 (FIG. 7).

COATING, INSPECTING AND REJECT MECHANISM

During the transfer between conveyor 32 and assembly machine 34, the containers, while supported upon chucks 72, are first inspected and then subjected to a coating treatment as they pass through a spray tunnel 36 (FIG. 2). The inspection is performed at an inspection station schematically illustrated at 38 in FIG. 2, and substandard containers are rejected at the lower left-hand corner of the path as viewed in FIG. 2 at a reject station designated generally 310. The inspection is performed prior to the coating in order to avoid exposure of the inspection elements to the vapor spray.

Figure 9:
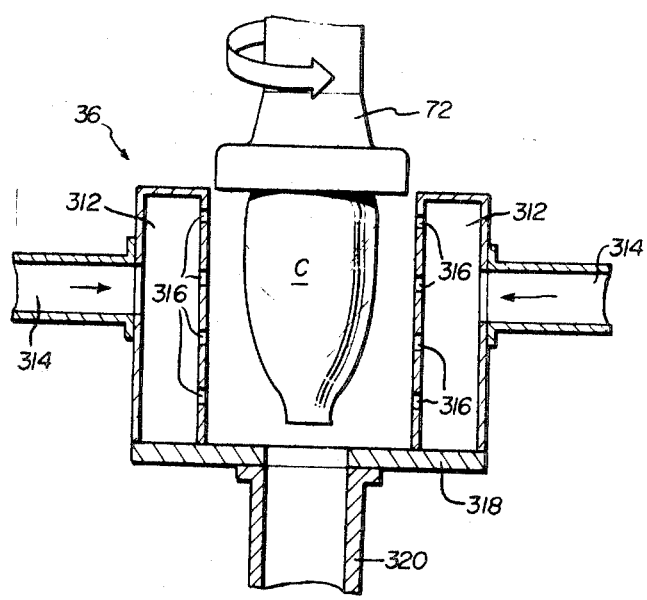
FIG. 9 is a simplified cross-sectional view of the spray tunnel.

Spray tunnel 36, except for the coating material applied, is functionally equivalent to that disclosed in a commonly owned copending application of Steve M. McLary, Ser. No. 851,649, filed Aug. 20, 1969. A simplified cross-sectional view through spray tunnel 36 is shown in FIG. 9. The tunnel is formed from sheet metal material to include a pair of chambers 312 which extend along opposite sides of the path of movement of the containers at an elevation such that that part of the container exposed below chuck 72 passes between chambers 312. The coating material, in vapor form, is supplied under pressure from a suitable source, not shown, to chambers 312 by suitably located inlet conduits 314 and is discharged from chambers 312 into the space traversed by the container through a series of discharge openings 316. The tunnel is formed with a bottom wall 318 and a number of suitably located exhaust ducts 320 are employed to continuously exhaust vapor from the space between chambers 312 to minimize the loss of vapor through the openings at the top and opposite ends of tunnel 36. Further details of the spray tunnel, source and exhaust system may be had by reference to the aforementioned copending application Ser. No. 851,649.

The particular coating which is applied to the containers as they pass through tunnel 36 is for the purpose of improving the scratch-resistant properties and lubricity of the container, and is a patented material (U.S. Pat. No. 2,995,533) commercially used by Owens-Illinois, Inc., under the trade name, "DuraCote." During the application of the coating in spray tunnel 36, it will be noted that a portion of the container bottom is shielded by the chuck from the coating vapor. However, the scratch-resistant properties and lubricity of the shielded or uncoated portion of the container are of no concern because in the completed container this portion will be located within a plastic cup or base—(See U.S. Pat. No. 3,372,826).

In order to achieve uniform exposure of all sides of the container to the coating vapor during the passage of the container through spray tunnel 36, chuck 72 is driven in rotation to rotate the container about its vertical axis throughout its passage through tunnel 36. Rotation of the chuck is accomplished by means of a spin-cycle chain 332 (FIG. 2) which is mounted at a fixed position upon frame 230 at a location to engage the teeth of sprockets 120 of head assemblies 50 as the heads pass above spray tunnel 36. Chain 332 is stationary and the motion of the heads along the endless path causes sprockets 120 to be rotated, thus rotating chucks 72 and the suspended container.

Before the containers are driven through spray tunnel 36, they are passed through inspection station 38, at which the sidewall and finish of the containers are inspected by a conventional inspection device. Details of the inspection device do not form, per se, any part of the present invention and any of several commercially available devices capable of generating an electric pulse or signal upon the detection of a malformed container might be employed. The electric pulse or signal generated by the inspection device when it detects a malformed container is fed into an electronic shift register incorporated in the inspection station which triggers reject station 310 when the malformed container reaches the reject point.

Details of the reject station 310 are best seen in FIGS. 10–14. The station includes a rotating wheel 330 mounted with a portion of its periphery tangential to the endless path of movement of heads 50 at that corner of the endless path where the heads change direction to move into alignment with assembly machine 34. A plurality of reject latch assemblies 322 are mounted on the periphery of wheel 330 in a uniform spacing corresponding to the spacing between the valve actuating arms 180 on successive head assemblies 50. Wheel 330 is driven in rotation in synchronism with the movement of the head assemblies so that as each head assembly passes around the corner of the path tangential to wheel 330, one of the reject latch mechanisms on wheel 330 is operatively aligned with the actuating arm 180 of a head assembly.

Figure 11:
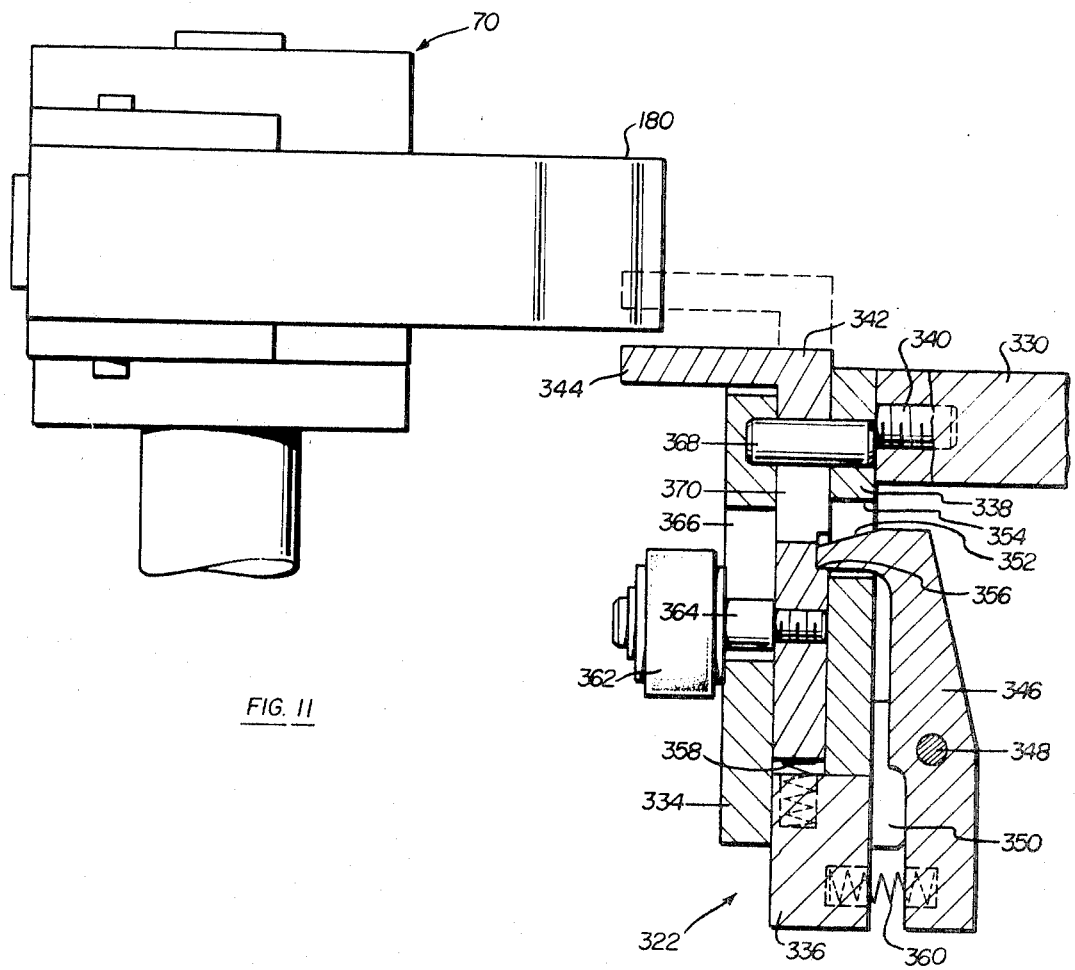
FIG. 11 is a cross-sectional view taken on line 11—11 of FIG. 10.

As best seen in FIG. 11, each reject latch mechanism 322 includes a housing having a front wall 334, a bottom wall 336 and a rear wall 338. The walls 334, 336 and 338 are fixedly secured to each other by suitably located bolts and in turn mounted upon wheel 330 as by bolts 340. Front and rear walls 334 and 338 are spaced from each other, and slidably mounted between these two walls is a latch member 342 having a forwardly projecting actuating cam 344 at its upper end. In FIG. 11, latch member 342 is shown in full line in its retracted position, where it is held by a latch tooth 346 pivotally supported upon a pin 348 mounted on a pair of ears 350 formed on rear wall 338. The tooth 352 of member 346 projects forwardly through an opening 354 in rear wall 338 and is seated in a notch 356 formed on the rear side of latch member 342. Latch member 342 is resiliently biased upwardly against tooth 352 by a pair of compression springs 358 engaged between bottom wall 336 and the bottom of latch member 342. Latch tooth member 346 is resiliently biased about its pivot 348 toward the full line position of FIG. 11 by another compression spring 360 seated between member 346 and a projection on bottom wall 336.

A reset roller 362 is rotatably mounted upon a shaft 364 which is fixedly secured to latch member 342 and projects forwardly through a slot 366 in front wall 334. A guide pin 368 is mounted in and extends between front wall 334 and rear wall 338, passing through a guide slot 370 in latch member 342. The engagement between pin 368 and the sidewalls of slots 370, combined with the similar sliding engagement between shaft 364 and the sidewalls of slot 366, guide the latch member in vertical movement relative to the front and rear walls.

A cam ramp 372 is formed on the leading edge of latch tooth 346.

When latch member 342 is latched in the full line retracted position shown in FIG. 11, its actuating cam 344 is located at an elevation such that it passes freely beneath the actuating arm 180 of the aligned head 50. Upon disengaging latch tooth 352 from latch member 342, the latch member is driven upwardly by compression springs 358 to the broken line position indicated in FIG. 11, where its cam 344 is located in the path of movement of valve actuating arm 180 so that cam 344 will engage the actuating arm 180 of an aligned head as the paths of the reject assembly 322 and head 50 move into tangency with each other at the 9 o'clock position in FIG. 10. When in its elevated or active position, the cam 344 will engage and depress the valve actuating arm 180 of the aligned head, thereby shifting the valve to connect the associated chuck to the air pressure source to eject the container from the chuck.

Tripping or releasing of latch tooth member 346 to permit the latch member 342 to move to its elevated or active position is accomplished by a latch trip mechanism designated generally 380, best seen in FIGS. 12 and 13. Mechanism 380 includes a solenoid 382 fixedly mounted on machine frame 230 as by a bracket 384. The armature of solenoid 382 is pivotally connected at 386 to an actuating link 388 whose opposite end is pivotally connected at 390 to an actuating arm 392. Arm 392 is pivotally supported at 394 upon a second bracket 396, which is likewise fixedly mounted on machine frame 230. A trip roller 398 is mounted for free rotation at the end of arm 392 remote from pivot 390. A compression spring 400 engaged between bracket 396 and actuating arm 392 resiliently biases the arm to the full line position shown in FIG. 12.

As shown in FIG. 12, trip mechanism 380 is in the position which it assumes when its solenoid 382 is deenergized. When solenoid 382 is energized, its armature and link 388 are driven to the right from the position shown in FIG. 3, thus driving actuating arm 392 in clockwise movement about its fixed pivot 394 to drive actuating roller 398 into the path of movement of the cam surfaces 372 of a latch tooth member 346 of a reject mechanism 322. As the mechanism 322 is driven past roller 398 when roller 398 is in its actuated position, the roller is struck by cam surface 372 and depresses the lower end of latch tooth 346, thereby withdrawing its tooth 352 out of engagement with the latch member to permit the latch member of the reject latch mechanism to move upwardly from its retracted to its actuated position.

Energization of solenoid 382 is under the control of an electronic shift register which is incorporated in inspection station 38. As explained above, when a malformed container is detected by inspection station 38, the station, in a well-known manner, generates an electric signal or pulse, and this signal or pulse is fed into the shift register.

The electronic shift register which is incorporated in inspection station 38 functions as a signal delay device which receives a signal from the inspection device, stores the signal, and feeds out the signal to solenoid 382 when the malformed container reaches the reject station. In the actual machine, the inspection is performed at a location some 33 stations upstream from the reject station, and the reject wheel has but 20 latch mechanisms 322 and thus it is necessary to store the reject signal. Details of the shift register per se form no part of the present invention—reference to U.S. Pat. No. 3,478,323 may be had for details of an exemplary system of this type and, in fact, suitable units are commercially available.

The shift register is set to feed the reject signal to solenoid 382 when the latch mechanism 322 which will be aligned with the head assembly 50 carrying the flawed container moves past approximately the 11 o'clock position of the roll as viewed in FIG. 10—i.e., about four stations before the paths of the latch and actuator 18 merge. Energization of solenoid 382 by the reject signal trips the latch 322.

To reset latch members which have been tripped, a reset mechanism designated generally 410 is mounted on machine frame 230 at approximately the 4 o'clock position with respect to the wheel periphery as viewed in FIG. 10. Mechanism 410 (FIG. 14) includes a bracket 412 fixedly mounted upon the machine frame and pivotally supporting one end of a reset arm 414 as by a pivot 416. As best seen in the plan view of FIG. 10, arm 414 is formed with a curved cam section 418 which is vertically aligned in overlying relationship with the path followed by reset rollers 362 of latch mechanisms 322. The elevation of pivot 416 is such that the underside of arm 414 at pivot 416 will lie just above the path of movement of an actuated reset roller 362.

At its opposite end, arm 414 has a downwardly depending bracket 420 fixedly mounted upon the lower side of the arm. Bracket 420 is pivotally connected as at 422 to the upper end of the piston rod 424 of a pneumatic motor 426. Motor 426 is in turn pivotally mounted as at 428 on a bracket 430 fixedly secured to machine frame 230. A tension spring 432 is connected between arm 414 and frame 230 to resiliently bias the end of arm 414 remote from pivot 416 into the downwardly inclined position best seen in FIG. 14. When arm 414 is in the FIG. 14 position, the right-hand end of arm 414 is at an elevation such that a reset roller engaged with the underside of arm 414 will be at its lower limit of movement with respect to its latch mechanism and will thus position the notch 356 of its latch member 342 below the tooth 352 of the associated latch element. As latch elements 322 which have been tripped are rotated past the cam section 418 of arm 414 with arm 414 in the downwardly inclined position of FIG. 14, the reset rollers 362 are forced downwardly by the inclined arm 414 to a position such that the latch tooth of the latch mechanism can be reengaged to latch the associated latch member 342 in its retracted or inactive position.

The purpose of pneumatic motor 426 is to render the reset mechanism inoperative. In the production line in which the present invention is employed, reject station 310 is the final point at which containers can be ejected from the system prior to their assembly into the plastic base, assembly of the glass container and plastic base being performed on assembly machine 34. Assembly machine 34 forms the subject matter of a commonly owned copending application of James D. Mallory and Frederick L. Wallington, Ser. No. 883,515 filed Dec. 9, 1969.

As explained in greater detail in application Ser. No. 883,515, the plastic bases (See FIG. 1) are fed to assembly machine 34 via chute 44 and automatically mounted upon the containers as the containers pass through machine 34. In the event of a malfunction of inadequate supply of plastic bases in the base supply system 42, it is much more practical to eject containers from the line at reject station 310 into cullet chute 40, from which the containers are fed back into the glass furnace as cullet and, in effect, recycled through the system.

Figure 14:
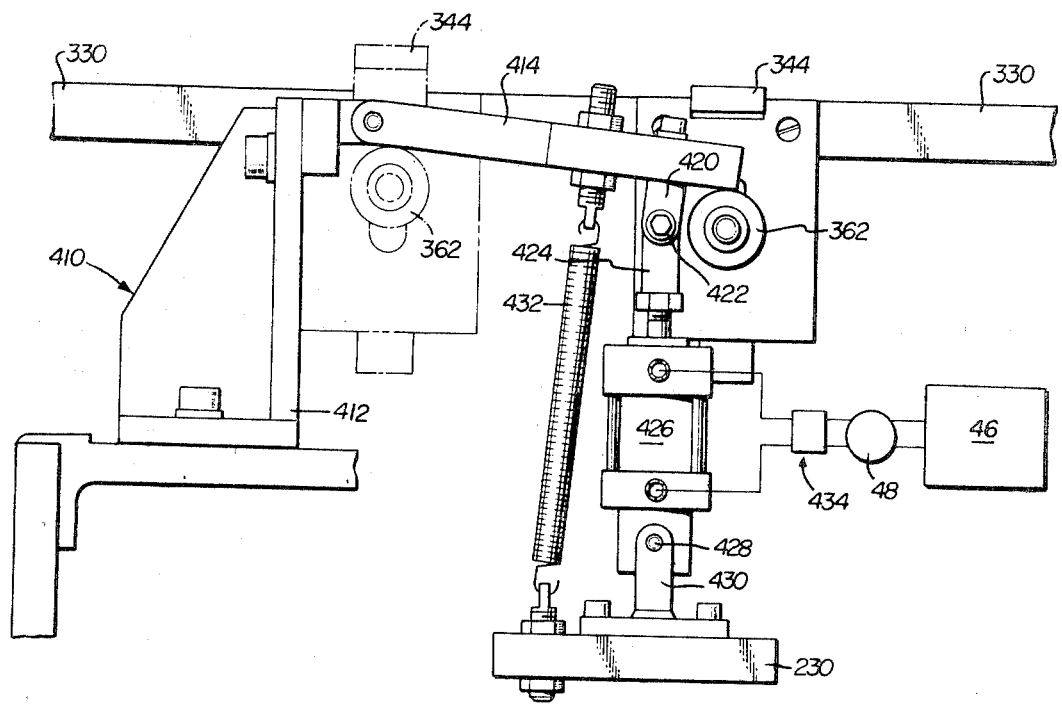
FIG. 14 is a side elevational view of the reject latch reset mechanism, with certain parts broken away, omitted, or shown in phantom.
Figure 15:
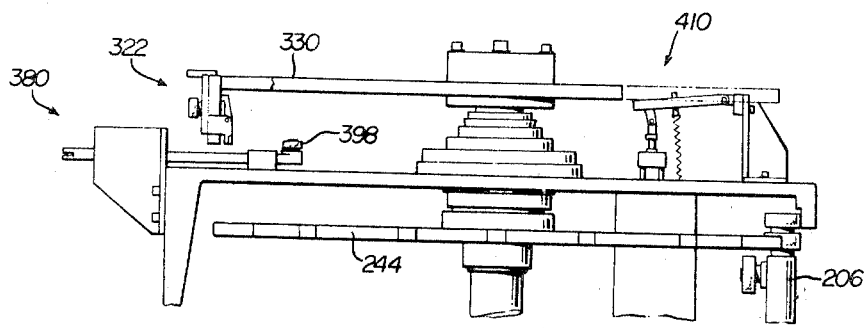
FIG. 15 is a side elevational view of the reject mechanism as viewed from the left-hand side of FIG. 10, with certain parts omitted.

Accordingly, the supply of air to motor 426 is from a suitable valve controlled source schematically illustrated at 434 which is in turn controlled by base supply detector 46 (FIG. 1) which, by conventional means, controls source 434 to cause piston rod 424 to be extended or elevated from the FIG. 14 position in the event of a malfunction or lack of supply of bases in base supply 42. When piston rod 424 is extended, arm 414 is elevated to a position such that its lower surface extends in a horizontal plane and thus is incapable of resetting tripped latch mechanisms.

SUMMARY OF OPERATION

To summarize the operation of the various devices described individually above, the endless chain of head assemblies 50, linked together by vertical rods 60, is driven in continuous movement around a generally rectangular endless path by drive motor 240. Movement of heads 50 along their endless path is synchronized with the movement of container supporting elements on both conveyor 32 and assembly machine 34 so that during those portions of their path in which the heads overlie conveyor 32 in assembly machine 34, each individual head is located and maintained in vertical alignment with a container or container support on conveyor 32 or assembly machine 34. The elevation of the individual heads is determined by the elevation of track 200 on the machine frame which supports a support roller 198 rotatably mounted on each head. Those portions of track 200 which overlap conveyor 32 and assembly machine 34 are formed with a depressed or dip section (FIGS. 7 and 8) which enables the heads to slide downwardly into operative relationship with the conveyor 32 or assembly machine 34 to pick up containers from conveyor 32 or to deposit containers onto assembly machine 34.

Each head assembly 50 carries at its lower end a pneumatic chuck (FIG. 5) which is supported upon a hollow shaft or spindle mounted for rotation about a vertical axis in the head assembly. At the upper end of each hollow shaft, a control valve 70 is mounted and connected, via conduits 270 and 272 to both a vacuum source and a supply of air under pressure, the two sources being connected to conduits 270 and 272 via a rotating carousel mounted centrally of the machine.

The valves 70 are normally self-maintained in a position such that the vacuum source is connected to the hollow spindle of the chuck. A valve member 100 is mounted at the lower end of the internal passage of the hollow shaft and is normally closed to block communication between the interior of the shaft and the interior of the chuck. When the chuck is lowered onto the bottom of an inverted container on conveyor 32, the container bottom engages a stem 102 on valve 100 and lifts this valve clear of its seat, thereby permitting the chuck to be evacuated to hold the container onto the chuck by vacuum. After the container has been gripped by the application of vacuum to the chuck, the head 50 moves onto an upwardly inclined section of track 200 and the head and suspended container are lifted clear of conveyor 32.

The head 50 then passes around a corner of its endless path and, as it does so, the sprocket 120 mounted upon the head engages a stationary chain 332 extending along the sprocket path so that the sprocket and the coupled hollow shaft and chuck are driven in rotation to rotate the suspended container about its axis as it passes along the chain.

The rotating container is carried through inspection station 38 where it is inspected for flows in its sidewall or finish. If the container is flawed, the inspection station generates a signal which is fed into the shift register. This signal is stored in the shift register while the flawed container is moving from the inspection station toward the reject station. As the flawed container approaches the reject station and reaches a position approximately four stations upstream from the point at which the path of its valve actuator merges with the path of latch mechanisms on the reject wheel, the stored reject signal is fed from the shift register to solenoid 382 to actuate reject latch trip mechanism 380. Trip mechanism 380 unlatches that reject latch assembly 322 which at this point of time is also approximately four stations prior to the point of merger of the latch teeth and valve actuator. Continued movement of the container with its head assembly 50 and rotation of the reject wheel brings the tripped latch assembly 322 into engagement with the valve actuating arm 180 on the head assembly carrying the flawed container as the paths of the two respective elements merge. Actuator 180 is engaged by the tripped latch assembly to shift the valve connections to supply air under pressure to the chuck carrying the flawed container to eject the container as its head assembly moves around the corner of the path approaching assembly machine 34.

After the container passes inspection station 38, it is carried through spray tunnel 36 where the container is exposed to a vapor spray of a coating material which improves the scratch resistance properties and lubricity of the container. During its transit through tunnel 36, the container is driven in rotation by the interengagement between the sprocket 120 on the head carrying the container and stationary chain 332 to achieve a uniform exposure of the container to the vapor spray within tunnel 36.

It has been found preferable to locate the inspection station 38 upstream from spray tunnel 36 to minimize exposure of the detecting elements of the inspection station to vapor from tunnel 36, the passage of the containers through spray tunnel 36 creating an air current which tends to create a slight flow of vapor from the downstream end of tunnel 36.

If the container inspected at inspection station 38 is found satisfactory, reject mechanism 310 does not eject the container, the latch member 342 of the appropriate reject latch assembly being maintained in its normal retracted position in which it passes beneath the valve actuating arm 180. After passing the reject station 310, the container is carried by the chuck into overlying relationship with assembly machine 34 and a container receiving pocket 303 is, by synchronism of machine 34 with the movement of head assemblies 50, positioned and maintained in vertical alignment beneath the suspended container. The support roller of the head assembly 50 moves onto a downwardly inclined section of its support track 200, thus lowering the chuck and its suspended container until the container is partially inserted into the aligned pocket 303 on assembly machine 34. At this point, the valve actuating arm 180 is carried into engagement with a stationary cam 306 which depresses the actuating arm to shift the valve 70 to supply air under pressure to the chuck to eject the container from the chuck into the pocket 303.

Tripped reject latches are reset by reset mechanism 410 which employs a normally downwardly inclined arm in the path of movement of reset rollers 362 of the latch mechanisms to force the elevated reset rollers of a tripped latch mechanism back downwardly to their normal or retracted position at which point the spring-loaded latch tooth member 346 is reengaged to latch the latch member and its reset roller in their normally maintained retracted position. As explained above, the reset mechanism may be rendered inoperable by actuation of air motor 426 to swing the reset arm 414 upwardly into a horizontal position where it is ineffective to reset latch members.

Having described one embodiment of our invention, we claim:

1. In a container handling apparatus for handling containers having hemispherical bottoms; container chuck means comprising a hollow annular housing having an open recess at one end and having an inlet passage extending axially from said recess through the opposite end of said housing, means in said recess at said one end of said housing defining an annular seat adapted to engage the hemispherical bottom of a container to locate the container in coaxial relationship with said housing with the container bottom projecting a predetermined distance into said recess, a flexible annular seal member mounted in said housing in coaxial relationship with said seat and located to sealingly engage the bottom of a container before the container engages said seat and to maintain the sealing engagement with the container bottom when the container bottom is engaged with said annular seat, normally closed valve means in said inlet passage operable when engaged by the bottom of a container engaged by said annular seal to open to place said inlet passage in communication with said recess, supply means in fluid communication with said inlet passage for selectively connecting said inlet passage to a source of vacuum or to a source of air under pressure, control valve means connected to said source of vacuum and said source of air under pressure, said control valve means being operable in one position to connect said inlet passage to said source of vacuum, and being operable in a second position to connect said inlet passage to said source of air under pressure, means normally maintaining said control valve means in said first position, conveying means for supporting and driving said chuck means along an endless path, a control valve means actuator mounted upon said control valve means and operable when depressed to shift said control valve means to said second position, cam means mounted alongside said endless path and operable to depress said actuator as said actuator is moved past said cam means, said conveying means comprising a cam element mounted for movement into and out of the path of movement of said actuator at a container eject station on said endless path, said cam element when located in the path of movement of said actuator being operable to depress the actuator as the actuator is moved past said eject station, and reject means operable prior to the arrival of said actuator at said eject station for selectively positioning said cam element in the path of movement of said actuator or maintaining said cam element out of the path of movement of said actuator.

2. The invention as defined in claim 1 wherein said reject means comprises means for inspecting the container carried by said chuck means, latch means normally maintaining said cam element out of the path of movement of said actuator, trip means in said reject means responsive to the detection of a flawed container by said inspection means for releasing said latch means to position said cam element in the path of movement of said actuator.

3. The invention defined in claim 2 further comprising a stationary cam mounted in the path of movement of said actuator at a container discharge station downstream of said endless path from said eject station and operable to depress said actuator each time said actuator is moved past said stationary cam.

4. In an article transfer apparatus having a frame, a plurality of chuck means linked into an endless chain and mounted upon said frame for movement along an endless path along which articles are transported from a receiving station tangentially around a portion of the periphery of at least one path direction changing roll to a discharge station, and chuck control means on each chuck means for operating the chuck means to selectively grip or release an article; the improvement wherein said control means is normally biased to a position maintaining the chuck means in its article gripping condition, an actuator carried by each control means and projecting therefrom and operable when depressed to shift the control means to place the chuck means in its article releasing condition; a plurality of reject latch means mounted upon said direction changing roll to rotate therewith into respective registry with the actuators of chuck means passing tangentially around said roll, each of said latch means having a cam mounted for movement between retracted position clear of the path of movement of the actuators and a reject position wherein said cam engages and depresses the actuator of a control means passing around said roll in registry with the latch means, means normally maintaining the cams in their respective retracted positions, first means for shifting the cam of a selected latch means from its retracted position to its reject position before the selected latch means moves into registry with a chuck means, and reset means operable in a reset position to reset cams from their reject position to their retracted position.

5. Container handling apparatus comprising a plurality of chucks linked together into an endless chain, conveying means for supporting and driving said chucks in movement along an endless path, a vacuum supply source, an air pressure source, each of said chucks comprising a container engaging head operable when supplied with vacuum to grip and support a container, valve means on each of said chucks communicating with said vacuum source and said air pressure source normally conditioned to place the associated head in communication with said vacuum source and operable when actuated to place the head in communication with said air pressure source to eject a container from the chuck, valve actuating means on each valve means normally maintained in a first position wherein said valve means is in its normal condition and movable relative to said valve means to a second position to actuate said valve means, first means on said conveying means at a first location on said endless path for loading containers into said chucks as said chucks are driven past said second location, container inspection means adjacent said endless path between said first and second locations operable to generate a reject signal upon the detection of a flawed container, and reject means located adjacent said endless path between said inspection means and said second location operable in response to a reject signal from said inspection means to shift the valve actuating means on the chuck carrying the flawed container to its second position to eject the flawed container before the flawed container reaches said second location.

6. Container handling apparatus as defined in claim 12 wherein said reject means comprises a wheel mounted for rotation with a portion of the periphery of the wheel tangential to said endless path, a plurality of reject latch means mounted at uniformly spaced positions around the periphery of said wheel corresponding to the spacing between the valve actuating means of adjacent chucks in said endless chain, means driving said wheel in rotation in synchronism with the movement of said chucks to align one of said latch means with the valve actuating means of one of said chucks as the chuck moves into tangency with the periphery of said wheel, each of said latch means having an actuating cam member normally located in a retracted position wherein said cam member is maintained clear of the valve actuating means of chucks and movable to an operative position wherein said cam member is moved into engagement with the valve actuating means of a chuck as the chuck moves into tangency with said wheel to shift the valve actuating means to its second position, means responsive to a reject signal from said inspection means for shifting the cam member of a latch means from its retracted position to its operative position before the latch means is moved into tangency with the chuck carrying the flawed container, and reset means operable after the latch means has moved out of tangency with the chuck to reset the cam member in its retracted position.

7. Apparatus for transporting and handling containers comprising a frame, a plurality of container handling head assemblies, link means linking said head assemblies into an endless chain, conveying means supporting and driving said endless chain of head assemblies in movement along an endless generally rectangular path upon said frame, each of said head assemblies having a vacuum actuated air pressure released container chuck thereon operable when supplied with vacuum to grip a container by its bottom to transport the container along said endless path in an inverted position and operable when supplied with pressure to eject and drop the container from the chuck, a source of air under pressure, a source of vacuum, valve means on each chuck normally connecting the chuck to said source of vacuum and actuable to connect the chuck to said source of air under pressure, infeed conveyor means for feeding inverted containers in line along a path aligned with one side of said generally rectangular path, receiving conveyor means aligned with another side of said generally rectangular path adapted to receive containers from said chucks, means for driving said infeed and said receiving conveyor means in synchronism with said head assemblies, first means for manipulating said head assemblies to cause the chucks thereon to pick up containers from said infeed conveyor means at a pick up station as said head assemblies are driven along said one side of said generally rectangular, second means for manipulating said head assemblies and actuating said valve means to deposit containers onto said receiving conveyor means at a deposit station as said head assemblies are driven along said another side of said generally rectangular path, and reject means operable to actuate the valve means of selected chucks at a location on said path intermediate said pick up station and said deposit station.

\* \* \* \* \*

PO-1050
(5/69)

UNITED STATES PATENT OFFICE
CERTIFICATE OF CORRECTION

Patent No. 3,637,074  Dated January 25, 1972

Inventor(s) John D. Banyas and Frederick L. Wallington

It is certified that error appears in the above-identified patent and that said Letters Patent are hereby corrected as shown below:

In the Specification:

Col. 4, line 67, "if" should be --is--

Col. 5, line 1, "216" should be --206--

Col. 10, line 48, "18" should be --180--

Col. 12, line 18, "flows" should be --flaws--

In the Claims:

Claim 6 (Col. 14, line 56) "12" should be --5--

Claim 7 (Col. 16, line 11) after "rectangular"

insert --path--

Signed and sealed this 29th day of August 1972.

(SEAL)
Attest:

EDWARD M. FLETCHER, JR.                    ROBERT GOTTSCHALK
Attesting Officer                            Commissioner of Patents